United States Patent
Saraswat et al.

(10) Patent No.: US 10,839,028 B2
(45) Date of Patent: Nov. 17, 2020

(54) SYSTEM FOR QUERYING WEB PAGES USING A REAL TIME ENTITY AUTHENTICATION ENGINE

(71) Applicant: Bank of America Corporation, Charlotte, NC (US)

(72) Inventors: Nitin Saraswat, Gurugram (IN); Bharat Bhushan Goyal, Gurugram (IN); Ambika Prasad Shukla, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 277 days.

(21) Appl. No.: 16/025,373

(22) Filed: Jul. 2, 2018

(65) Prior Publication Data
US 2020/0004881 A1 Jan. 2, 2020

(51) Int. Cl.
*G06F 16/951* (2019.01)
*H04L 9/32* (2006.01)
*G06F 16/2457* (2019.01)

(52) U.S. Cl.
CPC ...... *G06F 16/951* (2019.01); *G06F 16/24578* (2019.01); *H04L 9/3239* (2013.01)

(58) Field of Classification Search
None
See application file for complete search history.

(56) References Cited

U.S. PATENT DOCUMENTS

| | | | |
|---|---|---|---|
| 9,009,134 B2 | 4/2015 | Xu et al. | |
| 9,135,238 B2 | 9/2015 | Bunescu et al. | |
| 9,251,133 B2 | 2/2016 | Chen et al. | |
| 9,311,290 B2 | 4/2016 | Chen et al. | |
| 2009/0119268 A1* | 5/2009 | Bandaru | G06F 40/258 705/7.12 |
| 2015/0169584 A1* | 6/2015 | Kwok | G06F 16/24578 707/730 |
| 2015/0286629 A1 | 10/2015 | Abdel-Reheem et al. | |
| 2016/0171113 A1 | 6/2016 | Fanous et al. | |

* cited by examiner

*Primary Examiner* — Giuseppi Giuliani
(74) *Attorney, Agent, or Firm* — Michael A. Springs

(57) ABSTRACT

A system for querying web pages to validate entity names is disclosed. The disclosed system receives a request for validating an entity name. The system identifies a search web link based on the information in the request. The system converts the request to a format appropriate for a search web page corresponding to the search web link. Then, the system sends the formatted request to the search web page via the search web link. The system receives a result web page and extracts a set of result entity names. The system then computes a hash value for the entity name in the request and each of the result entity names. Next, the system compares the hash value computed for the entity name in the request with hash values computed for each of the result entity names and determines a matching score for each of the result entity names based on the comparison of the hash values.

17 Claims, 6 Drawing Sheets

| Result entity names 214 | Document numbers 402 | Status 404 |
|---|---|---|
| Result entity name 1 | Document number 1 | Active |
| Result entity name 2 | Document number 2 | Inactive |
| Result entity name 3 | Document number 3 | Active |
| ... | ... | ... |

FIG. 4

| Result entity names 214 | Result web links 216 |
|---|---|
| Result entity name 1 | Result URL 1 |
| Result entity name 2 | Result URL 2 |
| Result entity name 3 | Result URL 3 |
| ... | ... |

*FIG. 5*

| Result entity names 214 | Result web links 216 | Matching score 602 |
|---|---|---|
| Result entity name 2 | Result URL 2 | 20 |
| Result entity name 3 | Result URL 3 | 18 |
| Result entity name 1 | Result URL 1 | 5 |
| ... | ... | ... |

*FIG. 6*

SYSTEM FOR QUERYING WEB PAGES USING A REAL TIME ENTITY AUTHENTICATION ENGINE

TECHNICAL FIELD

This disclosure relates generally to querying web pages, and more particularly to a system for querying web pages using a real time entity authentication engine.

BACKGROUND

Web servers may receive a significant number of web requests in a short time frame. For example, a web server that hosts web pages may receive thousands of web requests for accessing the web pages per second. This creates a strain in the computing resources, memories, and network resources for processing the web requests. Traditional systems have proven inefficient in processing the web requests.

SUMMARY

A web server employing a web search engine receives thousands of web requests that query its web pages per second. This creates a strain in the computing resources, memories, and network resources for processing the web requests. For example, a user may want to access a search web page and perform a web search for validating an entity. The web search may be performed for validating whether a business entity is registered in a state registry and whether the details listed out on the state registry link match with those claimed. The web search may be also performed for validating whether a business entity is listed on a specific stock exchange as it claims to be. The web search may be also performed for validating whether a business entity is listed as being compliant with certain statutory requirements from a regulation authority. In the above examples, the user needs to identify the search web page associated with a state registry, a stock exchange, or a regulation authority, and sends a web search request to the search web page. One search web page may use a search format for a web search request that is different from another search web page. For example, a search web page for a state registry may use a search format for a web search request that is different from a stock exchange and/or a regulation authority. If the user sends a web search request to a search web page with a search format that is not meant for the search web page, the search web page may be unable to process the web search request. The search web page may ask the user to change the web search request to a format appropriate for the search web page and resend the web search request. This would raise the demand in the computing resource, memory, and network resources for sending repeated web search requests to the search web page. Thus, repeatedly querying the search web pages results in a waste in computing resource, memory, and network resources and further creates a network bottleneck and reduces the network speed. This creates a technical challenge of conforming to the search format requirements of different search web pages and such technical challenge is inherently rooted in computer networks.

The present disclosure presents a system that efficiently processes the web search requests that query the search web pages. In some embodiments, the system stores a search dictionary that includes a number of search web links corresponding to a number of search web pages. Each search web page has a corresponding search format. At some point the system receives a request for validating an entity. The request includes an entity name associated with the entity and a first field name for validating the entity. The first field name identifies a first search web page corresponding to a first search web link in the search dictionary. The system then identifies the first search web link in the search dictionary corresponding to the first search web page identified by the first field name. The system further converts the request to a first format corresponding to the first search web page. Then, the system sends the request having the first format to the first search web page via the first search web link. In response to the request, the system receives a set of result entity names and a set of result web links associated with the set of result entity names. Next, the system computes a hash value for the entity name in the request and a set of hash values for the set of result entity names by applying a predetermined hash function to the entity name in the request and each of the set of result entity names. The system then compares the hash value for the entity name in the request with each of the hash values for the set of result entity names and determines a matching score for each of the set of result entity names based on the comparison. The system then ranks the set of result entity names based on the determined matching scores for the set of result entity names.

The system provides a technical solution to addressing the technical problem inherently rooted in computer network as noted before. For example, the system stores a search dictionary that includes a number of search web links corresponding to a number of search web pages, wherein each search web page has a corresponding search format. The system receives a web request that identifies a target search web page and converts the web request in a format that is appropriate for the target search web page from the outset of the search. In this way, the system conserves computing resource, memories, and network resources for correcting the search format of the web request and repeatedly querying the target search web page. Note that the system implementing this technical solution is different from conventional systems. Conventional systems, as noted before, are unable to process a web search request that does not have the right search format for a target search web page. Instead, conventional solutions may ask a user to change the web search request to a format appropriate for the target search web page and resend the web search request which leads to increased network traffic, network bottlenecks, and strain in the processor that responds to such requests. Therefore, the system disclosed in the present disclosure achieves a technological improvement of efficiently processing web requests that query a search web page by preformatting the web requests.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which:

FIG. 4 illustrates an exemplary embodiment of a web table, according to the present disclosure;

FIG. 5 illustrates an exemplary embodiment of information extracted from a web table, according to the present disclosure; and FIG. 6 illustrates an exemplary embodiment of result entity names ranked based on matching score, according to the present disclosure.

DETAILED DESCRIPTION

Figure 1:
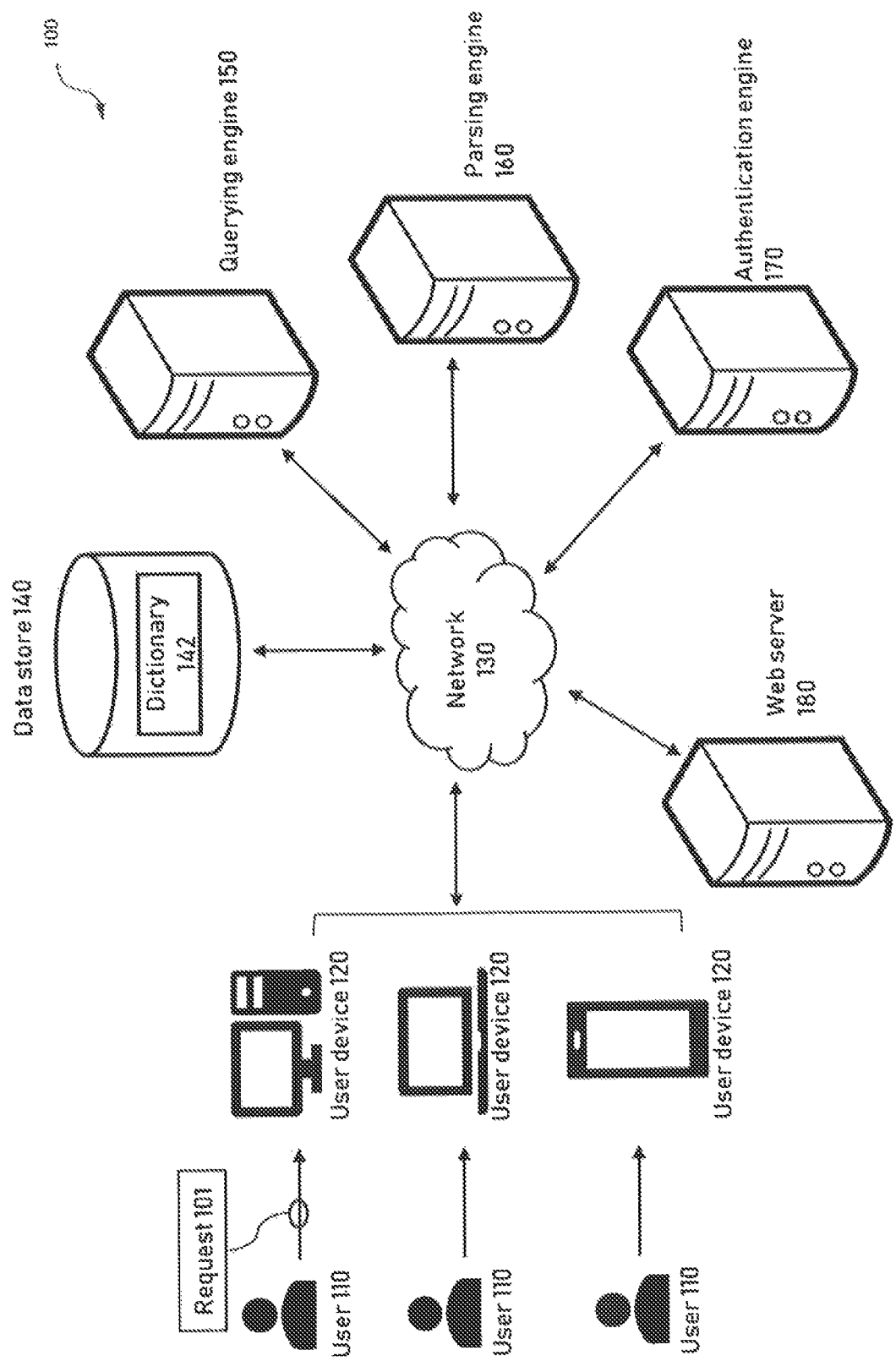
FIG. 1 illustrates an exemplary embodiment of a system for querying web pages, according to the present disclosure.

FIG. 1 illustrates an exemplary embodiment of a system 100 for querying web pages, according to certain embodiments of the present disclosure. System 100 includes one or more user devices 120, a network 130, a data store 140 configured to store a search dictionary 142, a querying engine 150, a parsing engine 160, a real time entity authentication engine 170, and a web server 180. The operation of system 100 will be discussed in greater detail below with reference to FIGS. 2-6.

In general, system 100 receives a web search request 101 from a user 110 operating on a user device 120 to query one or more search web pages 210 stored in web server 180. The web search request 101 may be a request to validate an entity with an entity name 202 at one or more search web pages 210. By submitting the request 101, user 110 may want to know whether the entity with the entity name 202 is legitimate. For example, user 110 may want to know whether the entity having the entity name 202 is conforming to certain laws, rules, or regulations. To validate the entity name 202, user 110 may search the entity name 202 on various justifiable, lawful, or statutory search web pages 210 to see whether the entity name 202 is listed on any of these search web pages 210 and whether the details listed out on the search web pages 210 match those claimed by the entity. For example, user 110 may send request 101 to a first search web page 210 for a state registry (e.g., "Florida state registry") to validate whether a business entity with the entity name 202 is registered in the state registry and whether the details listed out on the state registry link match with those claimed. User 110 may also send the request 101 to a second search web page 210 for a stock exchange (e.g., "The New York Stock Exchange") to validate whether the business entity with the entity name 202 is listed on the stock exchange as it claims to be. User 110 may further send the request 101 to a third search web page 210 for a regulation authority (e.g., "U.S. Securities and Exchange Commission") to validate whether the business entity with the entity name 202 is listed as being compliant with certain statutory requirements from the regulation authority. As such, user 110 need to send request 101 to each of these search web pages 210 to validate entity name 202.

However, each of these search web pages 210 usually has its corresponding search format. For example, a first search web page 210 for a state registry may accept a request 101 with a free format consisting of any piece of data in request 101. A second search web page 210 for a stock exchange may accept a request 101 with a structured database format consisting of specifically structured or modified data in request 101. Therefore, from the outset of the search, request 101 needs to be converted to a formatted request 208 with an appropriate format for each of the search web pages 210.

Accordingly, system 100 performs pre-processing (e.g. formatting) on received request 101 at the querying engine 150. Specifically, system 100 identifies a search format for each of the search web pages 210 identified in the request 101 and converts the request 101 to a formatted request 208 with an appropriate format for each of the search web pages 210. System 100 will send the formatted requests 101 to each of the search web pages 210 based on their corresponding search formats. To send the formatted requests 101 to the search web pages 210, system 100 needs to identify web addresses (e.g., search web links 206) corresponding to the search web pages 210.

Search web links 206 are stored in dictionary 142 in data store 140. Dictionary 142 generally is configured as an up-to-date storage to store valid search web links 206 corresponding to the search web pages 210. System 100 identifies one or more search web links 206 stored in dictionary 206 that correspond to the search web pages 210 identified in the request 101 and send the formatted requests 208 to the search web pages 210 via the identified search web links 206.

In response to the formatted requests 208, each of the search web pages 210 may return a result web page 212 including a set of result entity names 214 each with a hyperlink. The set of result entity names 214 may look similar to the entity name 202 in the request 101. However, there may be only one or a subset of the result entity names 214 that are relevant to the entity name 202 in request 101. Usually user 110 needs to click on the hyperlink of each of the result entity name 214 and verify whether a hyperlink associated with a result entity name 214 is relevant to the entity name 202. However, this process is time-consuming and uses a lot of computing resources, memories, and network resources. In the present disclosure, system 100 may parse each of the result web pages 212 and extract a set of result entity names 214 and a set of associated result web links 216 from each result web page 212 at parsing engine 160. Authentication engine 170 of system 100 computes hash values 218 for entity name 202 and result entity names 214 using a hash function, and compares the hash value 218 computed for entity name 202 with each of the result entity names 214 based on pattern matching to determine matching scores for the result entity names 214 with respect to the entity name 202. Based on the matching scores, system 100 may find one or more result entity names 214 that mostly closely match entity name 202 and provide corresponding result web links 216 to user 110 for verifying whether the result web links 216 are relevant to entity name 202. Pattern matching using hash functions significantly speeds up the matching process while maintaining an acceptable security level. By identifying result entity names 214 that mostly closely match entity name 202 and providing the corresponding result web links 216 to user 110, system 100 is able to avoid consuming previous computing resources, memories, and network bandwidth on verifying each of the result web links 216, thereby increasing the efficiency of validating process.

Users 110 comprise any suitable users including businesses or other commercial organizations, government agencies, and/or individuals. Users 110 may operate on one or more user devices 120 to access system 100.

User devices 120 comprise any suitable devices or machines configured to communicate with other network devices in the system 100. Typically, user device 120 is a data processing system comprising hardware and software that communicates with the other network elements over a network, such as the Internet, an intranet, an extranet, a private network, or any other medium or link. These data processing systems typically include one or more processors, an operating system, one or more applications, and one or more utilities. Applications running on the data processing systems provide native support for web protocols including, but not limited to, support for Hypertext Transfer Protocol (HTTP), Hypertext Markup Language (HTML), and Extensible Markup Language (XML), among others. Examples of user devices 120 include, but are not limited to, desktop computers, mobile phones, tablet computers, and laptop computers.

Network 130 includes any suitable networks operable to support communication between components of system 100. Network 130 may include any type of wired or wireless communication channel capable of coupling together computing nodes. Network 130 may include any interconnecting system capable of transmitting audio, video, electrical signals, optical signals, data, messages, or any combination of the preceding. Network 130 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. Network 130 may be configured to support any communication protocols as would be appreciated by one of ordinary skill in the art upon viewing this disclosure.

Data store 140 is generally configured to store web addresses 206, according to some embodiments of the present disclosure. Data store 140 includes any suitable storage scheme including any software, hardware, firmware, and/or combination thereof capable of storing information. Exemplary data store 140 includes individual data storage devices (e.g., disks, solid-state drives), which may be part of individual storage engines and/or may be separate entities coupled to storage engines within. Data store 140 may store third-party databases, database management systems, a file system, and/or other entities that include or that manage data repositories. Data store 140 may be locally located or remotely located to other components of system 100.

Figure 2:
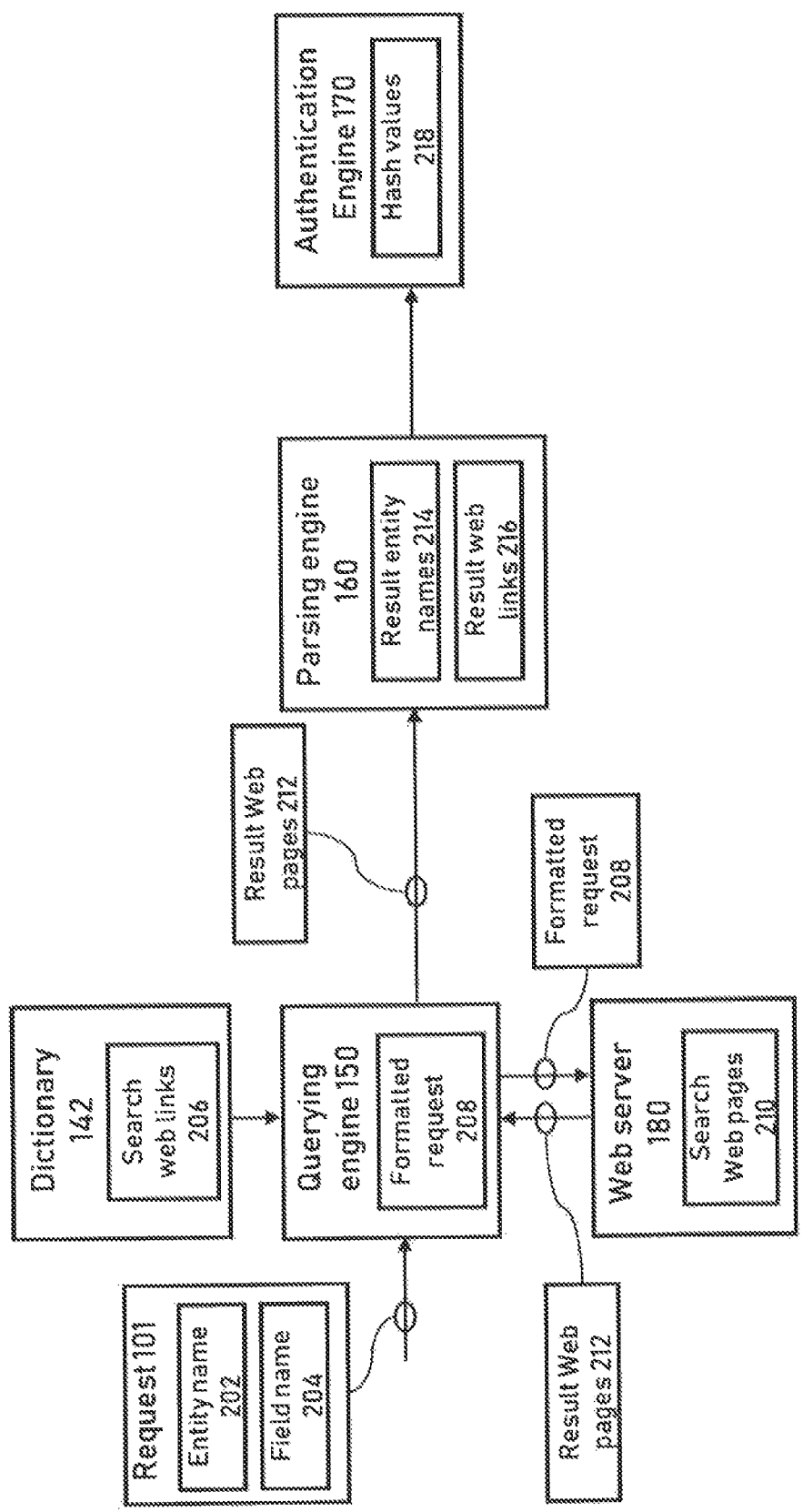
FIG. 2 presents a block diagram illustrating an exemplary embodiment of a system for querying web pages, according to the present disclosure.

As illustrated, data store 140 is configured to store a search dictionary 142. Dictionary 142 may employ any suitable framework for storing web addresses 206. For example, dictionary 142 may employ a python web framework. Referring to FIG. 2, dictionary 142 is configured to store a plurality of search web links 206. Search web links 206 include web addresses corresponding to search web pages 210 stored in web server 180. For example, search web links 206 may include web addresses corresponding to search web pages 210 associated with a state registry, a stock exchange, or a regulation authority. Search web links 206 may have any suitable format for identifying a location of a web resource. For example, search web links 206 may include uniform resource locator (URL) addresses.

Querying engine 150 is generally configured to process requests 101 for web server 180. Querying engine 150 includes any suitable server, processor, or computing element configured to process request 101 and query web server 180. Querying engine 150 may be configured to receive request 101 via network 130 from user 110 operating on user device 120. Request 101 may include a request for validating an entity name associated with an entity, such as a business or commercial organization, a government agency, etc. As illustrated in FIG. 2, request 101 includes an entity name 202 and a field name 204. Entity name 202 is configured to identify an entity, for example such as a business or commercial organization, or a government agency, as described above. Field name 204 is configured to identify a search web page 210 for searching and validating entity name 202. For example, field name 204 may be configured to identify search web pages 210 for a search web site, for example such as a state registry, a stock exchange, or a regulation authority. Querying engine 150 may identify a search web link 206 in dictionary 142 that corresponds to a search web page 210 identified by field name 204 in request 101. For example, querying engine 150 may receive a request 101 that includes field name 202 identifying a search web page 210 for a state registry, such as "Florida state registry," to validate whether the entity name 202 is registered in the state registry and whether the details listed out on the state registry link match with those claimed. Querying engine 150 may subsequently identify a search web link 206 in dictionary 142 that corresponds to "Florida state registry."

Querying engine 150 is further configured to convert request 101 to a formatted request 208 with an appropriate format for a search web page 210 corresponding to the search web link 206, as determined above. Note that each search web page 210 may have a corresponding search format that is the same as or different from each other. For example, a first search web page 210 for a state registry may accept a request 101 with a free format consisting of any piece of data in request 101. A second search web page 210 for a stock exchange may accept a request 101 with a structured database format consisting of specifically structured or modified data in request 101. Therefore, from the outset of the search, request 101 is converted to a formatted request 208 with an appropriate format for each of the search web pages 210. Converting the request 101 to an appropriate format for each of the search web pages 210 helps save computer resources and reduce network traffic and bottlenecks associated with improper search requests. For example, if a request 101 is sent to a search web page 210 with an inappropriate search format, the search web page 210 may be unable to process the request 101. Instead, the search web page 210 may notify user 110 that the request 101 cannot be processed and that user 110 needs to resend a request 110 with an appropriate format for the search web page 210. The user 110 then needs to resend the request 110 with an appropriate format. Such conversation between the search web pages 210 and the user 110, including search web page 210 notifying the user 110 of the inappropriate format of the request 101 and the user 110 resending the request 101 with an appropriate format, requires extra network resource (e.g., bandwidth) for successfully processing the search request 101. If user 110 must resend formatted requests 208 to the multiple search web pages 210, it will consume a lot more network bandwidth, thereby increasing network traffic and bottleneck. On the contrary, querying engine 150 converts the request 101 to an appropriate format for each search web page 210 before sending the request 101 to the search web pages 210. In this way, it avoids using extra network bandwidth for the search web pages 210 to notify the user 110 of the inappropriate format of the request 101 and for the user 110 to resend the request 101 with an appropriate format.

Querying engine 150 is further configured to send formatted request 208 to web server 180. For example, querying engine 150 may send formatted request 208 to a search web page 210 in web server 180 via the search web link 206 as determined above. In some embodiments, search web page 210 generates and returns one or more result web pages 212 to querying engine 150 in response to formatted request 208. Querying engine 150 may forward result web pages 212 to parsing engine 160 for subsequent processing.

Parsing engine 160 is generally configured to parse result web pages 212 and extract useful information from them. Parsing engine 160 includes any suitable server, processor, or computing element configured to parse a result web page 212. Parsing engine 150 may be configured to parse web tables 400 included in result web pages 212 as described below in greater detail with reference to FIG. 4. As illustrated in FIG. 2, parsing engine 160 is configured to extract a set of result entity names 214 and a set of associated result web links 216 from result web pages 212. Each of the result web links 216 corresponds to a web page associated with a result entity name 214. Parsing engine 160 may forward result entity names 214 and associated result web links 216 to authentication engine 170 for subsequent processing.

Authentication engine 170 is generally configured to analyze result entity names 214 and verify the result entity names 214 via associated result web links 216 to validate entity name 202 in request 101. Authentication engine 170 includes any suitable server, processor, or computing element configured to validate entity name 202. Authentication engine 170 may be configured to compare entity name 202 in request 101 with each of result entity names 214 received from parsing engine 160 and determine one or more result entity names 214 that most closely match entity name 202. In some embodiments, authentication engine 170 is configured to compute a hash value 218 for entity name 202 and a set of hash values 218 for result entity names 214. For example, authentication engine 170 may apply a hash function, for example such as a MD5 hash function, to entity name 202 and each of result entity names 214.

Authentication engine 170 further compares hash value 218 for entity name 202 with each of the hash values 218 for result entity names 214 and determine a matching score for each of result entity names 214 based on pattern matching of hash values 218. For example, authentication engine 170 may determine how many strings match between hash value 218 computed for entity name 202 and each hash value 218 computed for result entity names 214 and determine the matching score based on the number of matching strings. The matching score may be determined as being proportional to the number of matching strings. Authentication engine 170 may further rank result entity names 214 based on their matching scores and identify one or more result entity names 214 with the highest matching scores. For example, authentication engine 170 may identify a result entity name 214 with the highest matching score. As another example, authentication engine 170 may identify result entity names 214 with the top-3 highest matching scores. Authentication engine 170 further identifies result web links 216 associated with the identified result entity names 214 with the highest matching scores. Authentication engine 170 may send the identified result web links 216 to users 110 for validating entity name 202.

An engine described in the present disclosure, such as querying engine 150, parsing engine 160, and authentication engine 170, may include hardware, software, or other engine(s). An engine may execute any suitable operating system such as, for example, IBM's zSeries/Operating System (z/OS), MS-DOS, PC-DOS, MAC-OS, WINDOWS, a .NET environment, UNIX, OpenVMS, or any other appropriate operating system, including future operating systems. The functions of an engine may be performed by any suitable combination of one or more engines or other elements at one or more locations.

A processor described in the present disclosure may comprise any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor may be a programmable logic device, a microcontroller, a microprocessor, or any suitable combination of the preceding. The processor may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

Disclosed system 100 further includes one or more memories. For example, data store 140 may include a memory configured to store dictionary 142. Querying engine 140 may include a memory configured to store formatted request 208. Parsing engine 160 may include a memory configured to store result entity names 214 and result web links 216. Authentication engine 170 may include a memory configured to store hash values 218 computed for entity name 202 and result entity names 214. The memories described in the present disclosure, may comprise any device operable to store, either permanently or temporarily, data, operational software, or other information for a processor. In some embodiments, the memory comprises one or more disks, tape drives, or solid-state drives, and may be used as an over-flow data storage device, to store programs when such programs are selected for execution, and to store instructions and data that are read during program execution. The memory may comprise any one or a combination of volatile or non-volatile local or remote devices suitable for storing information. For example, the memory may comprise random access memory (RAM), read only memory (ROM), magnetic storage devices, optical storage devices, semiconductor storage devices, or any other suitable information storage device or a combination of these devices.

Figure 3:
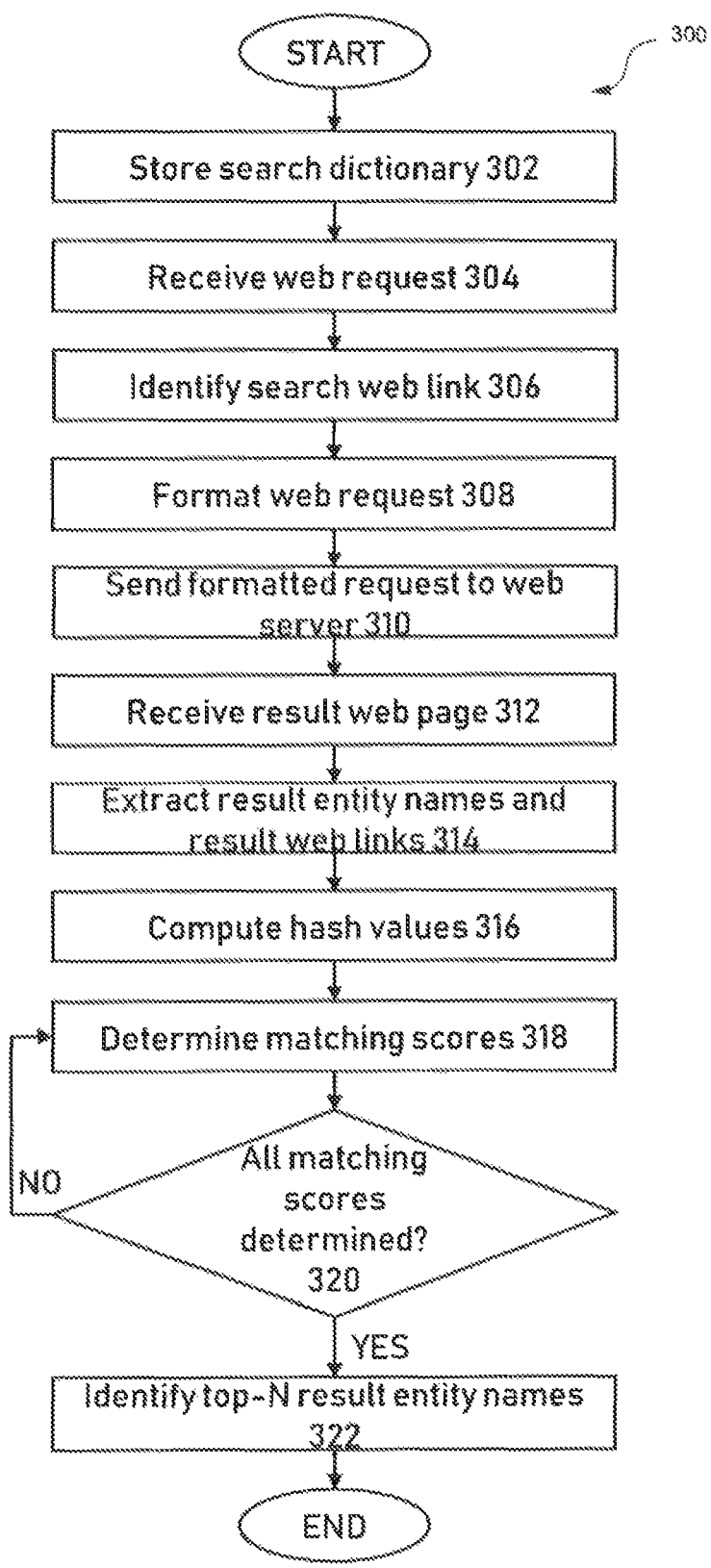
FIG. 3 presents a flow chart illustrating an exemplary embodiment of a method of querying web pages, according to the present disclosure.

FIG. 3 presents a flow chart illustrating an exemplary embodiment of a method 300 of querying web pages. The following is a non-limiting example that illustrates how system 100 implements method 300.

Upon starting the process, method 300 stores dictionary 142 in data store 140 (step 302). Dictionary 142 may employ a python web framework configured to store web addresses for querying entity name 202. According to some embodiments of the present disclosure, dictionary 142 is configured to store a plurality of search web links 206 corresponding to a plurality of search web pages 210 stored in web server 180. Search web pages 210 may include justifiable, lawful, or statutory search web pages where a user 110 can verify whether an entity name 202 is legitimate. User 110 may search the entity name 202 on each search web pages 210 to see whether the entity name 202 is listed on the search web page 210 and whether the details listed out on the search web page 210 match those claimed by the entity. For example, a first search web page 210 for a state registry (e.g., "Florida state registry") may enable user 110 to validate whether a business entity with the entity name 202 is registered in the state registry and whether the details listed out on the state registry link match with those claimed. A second search web page 210 for a stock exchange (e.g., "The New York Stock Exchange") may enable user 110 to validate whether the business entity with the entity name 202 is listed on the stock exchange as it claims to be. A third search web page 210 for a regulation authority (e.g., "U.S. Securities and Exchange Commission") may enable user 110 to validate whether the business entity with the entity name 202 is listed as being compliant with certain statutory requirements from the regulation authority.

Search web links 206 include web addresses associated with the search web pages 210. Search web links 206 have any suitable format for identifying a location of a web resource. For example, search web links 206 may include uniform resource locator (URL) addresses. Dictionary 142 may be configured to store a first search URL associated with a first state registry, a second search URL associated with a second state registry, a third search URL associated with a stock exchange, and a fourth search URL associated with an authority regulation.

At step 304, method 300 receives a web search request 101. For example, system 100 may receive request 101 via network 130 from user 110 operating on user device 120. The web search request 101 may be a request to validate an entity with an entity name 202 at one or more search web pages 210 that correspond to one or more search web links 206. By submitting the request 101, user 110 may want to know whether the entity with the entity name 202 is legitimate. For example, user 110 may want to know whether the entity having the entity name 202 is conforming to certain laws, rules, or regulations. In some embodiments, request 101 includes an entity name 202 and a field name 204. Entity name 202 is configured to identify an entity, for example such as a business or commercial organization, a government agency as described above. Field name 204 is configured to identify a search web page 210 for searching and validating entity name 202. Field name 204 may include a state registry name, a stock exchange name, or a regulation authority name that corresponds to a search web link 206 for verifying whether an entity name 202 is legitimate. For example, field name 204 may be configured to identify search web pages 210 for a state registry such as "Florida state registry" to verify whether a business entity with the entity name 202 is registered in the state registry and whether the details listed out on the state registry link match with those claimed. In alternative embodiments, request 101 includes more than one field names 204 that identify more than one search web pages 210.

Execution proceeds to step 306 where a search web link 206 is identified based on field name 204 included in request 101. In some embodiments, method 300 may identify a search web link 206 stored in dictionary 142 that corresponds to a search web page 210 identified by field name 204. For example, method 300 may identify a URL in dictionary 142 that corresponds to "Florida state registry." As noted before, each search web link 206 corresponds to a web page 210 stored in web server 180, and each web page 210 has a corresponding search format required for request 101. Each web page 210 may have a search format that is the same as or different from each other. For example, a first search web page 210 may only accept a request 101 with a free format consisting any piece of data in request 101. A second search web page 210 may only accept a request 101 with a structured database format consisting of specifically structured or modified data in request 101. If a search web page 210 receives a request 101 with a format that is not appropriate for the search web page 210, the search web page 210 may be unable to process the request 101 and may request user 110 resend request 101 in an appropriate format. This, however, will significantly increase the processing time for request 101 and consume more computing and network resources. For example, if a request 101 is sent to a search web page 210 with an inappropriate search format, the search web page 210 may be unable to process the request 101. Instead, the search web page 210 may notify user 110 that the request 101 cannot be processed and that user 110 needs to resend a request 110 with an appropriate format for the search web page 210. The user 110 then needs to resend the request 110 with an appropriate format. Such conversation between the search web pages 210 and the user 110, including search web page 210 notifying the user 110 of the inappropriate format of the request 101 and the user 110 resending the request 101 with an appropriate format, requires extra network resource (e.g., bandwidth) for successfully processing the search request 101. If user 110 must resend formatted requests 208 to the multiple search web pages 210, it will consume a lot more network bandwidth, thereby increasing network traffic and bottleneck. On the contrary, querying engine 150 converts the request 101 to an appropriate format for each search web page 210 before sending the request 101 to the search web pages 210. In this way, it avoids using extra network bandwidth for the search web pages 210 to notify the user 110 of the inappropriate format of the request 101 and for the user 110 to resend the request 101 with an appropriate format. Furthermore, if the request 101 has an inappropriate format for a search web page 210, a portion of the processor power is needed for processing the improper request 101. In other words, the processor power is not dedicated to processing proper requests 101. This will slow down the processing of the requests 101. On the other hand, converting the request 101 to an appropriate format for a search web pages 210 helps reduce or eliminate the overhead of the processor power used for processing improper requests 101, thereby speeding up the processing of the requests 101. Therefore, converting the request 101 to an appropriate format for each of the search web pages 210 helps save computer resources and reduce network traffic and bottlenecks associated with improper search requests.

At step 308, method 300 converts request 101 to a formatted request 208 with a format appropriate for a search web page 210 corresponding to a search web link 206 as determined above. Method 300 may identify the search format required for a search web page 210 identified by field name 204 and convert request 101 to the identified search format. In embodiments where request 101 includes multiple field names 204 identifying multiple search web pages 210, method 300 identifies search formats for each of the search web pages 210 and converts request 101 to the search formats corresponding to each of the search web pages 210 respectively. For example, method 300 may determine that a first search web page 210 identified by a first field name 204 has a first search format and convert request 101 to a formatted request 208 with the first search format. As another example, method 300 may determine that a second search web page 210 identified by a second field name 204 has a second search format that is different from the first search format, and convert request 101 to a formatted request 208 with the second search format. After converting request 101 to a formatted request 208, method 300 proceeds to step 310.

At step 310, method 300 sends formatted request 208 to web server 180 for querying entity name 202. For example, querying engine 150 may send formatted request 208 to search web page 210 in web server 180 via search web link 206 as determined above. In embodiments where request 101 is converted to multiple formats for multiple search we pages 210, querying engine 150 sends multiple formatted requests 208 to the multiple search web pages 210 respectively. In some embodiments, search web pages 210 generate and return one or more result web pages 212 in response to formatted requests 208.

At step 312, method 300 receives one or more result web pages 212 from search web pages 210. Result web page 212 generally includes query result generated from search web page 210, for example, such as a list of result entity names 214 each with a hyperlink. The set of result entity names 214 may look similar to the entity name 202 in the request 101. However, there may be only one or a subset of the result entity names 214 that are relevant to the entity name 202 in request 101.

In some embodiments, referring to FIG. 4, result web page 212 includes a web table 400. As illustrated, web table 400 is configured with a first column 406 that includes a number of result entity names 214, a second column 408 that includes a number of corresponding document numbers 402, and a third column 410 that includes a number of corresponding status 404. For example, column 406 includes result entity name 1, result entity name 2, and result entity name 3. Column 408 includes document number 1 corresponding to result entity name 1, document number 2 corresponding to result entity name 2, and document number 3 corresponding to result entity name 3. Column 410 includes an active status corresponding to result entity name 1, an inactive status corresponding to result entity name 2, and an active status corresponding to result entity name 3. Note that in some embodiments, each result entity name 214 in column 406 includes a hyperlink identifying a web address associated with the result entity name 214. For example, each result entity name 214 is associated with a result web link 216.

Although table 400 is described with respect to columns 406, 408, and 410, one of ordinary skill in the art will appreciate that any suitable organization of data or data structure that stores result entity names 214, document numbers 402, and status 404. The first, second, and third columns of table 400 are each illustrated as having entries for illustrative purposes only. They may have any suitable number of entries.

Referring back to FIG. 3, at step 314, method 300 parses result web page 212 and extracts useful information. For example, method 300 may parse a web table 400 included in a result web page 212 and extract result entity names 214 and associated result web links 216 from web table 400. As noted before, the set of result entity names 214 may look similar to the entity name 202 in the request 101 and there may be only one or a subset of the result entity names 214 that are relevant to the entity name 202 in request 101. User 110 may need to click on each result web link 216 to verify whether the result web link 216 is relevant to entity name 202. A result web link 216 may include a URL address associated with a result entity name 214. For example, referring to FIG. 5, method 300 extracts result entity names 214 including result entity name 1, result entity name 2, and result entity name 3 from column 406 of web table 400. Method 300 further extracts result web links 216 including result URL 1 associated with result entity name 1, result URL 2 associated with result entity name 2, and result URL 3 associated with result entity name 3. In embodiments where multiple result web pages 212 are returned, method 300 may parse web table 400 in each of the multiple result web pages 212, extract result entity names 214 and result web links 216 in each web table 400, and put the extracted result entity names 124 and associated result web links 216 in a single list as described in FIG. 5.

Referring back to FIG. 3, execution proceeds to step 316 where method 300 computes hash values 218 for entity name 202 and each of result entity names 214. For example, method 300 may apply a predetermined hash function to entity name 202 and each of result entity names 214. In some embodiments, the predetermined hash function is a MD5 hash function. Method 300 may use hash values 218 computed for entity name 202 and result entity names 214 to determine a similarity between entity name 202 and each of result entity names 214 based on pattern matching of the hash values 218. Pattern matching using hash functions significantly speed up the matching process while maintaining an acceptable security level. Conventional string matching methods are more computationally expensive than pattern matching using hash functions. For example, conventional string matching methods may use more processors for performing string matching with significantly more computing time. On the contrary, pattern matching using hash functions is a significantly quick approach to perform string matching between entity name 202 and result entity names 214. Therefore, pattern matching using hash functions uses less computing resources, reduces processing time, thereby increasing the efficiency of the disclosed system 100. Based on the pattern matching of the hash values 218, system 100 may identify result entity names 214 that mostly closely match entity name 202.

At step 318, method 300 determines a matching score 602 for each of result entity names 214 with respect to entity name 202. Method 300 may compare hash value 218 computed for entity name 202 with each hash value 218 computed for result entity names 214, and determine a matching score for each of result entity names 214 based on pattern matching of hash values 218. For example, method 300 may determine how many strings match between hash value 218 computed for entity name 202 and each hash value 218 computed for result entity names 214 and determine the matching score based on the number of matching strings. The matching score 602 may be proportional to the number of matching strings. For example, referring to FIG. 6, method 300 may determine a first matching score of 5 for result entity name 1, a second matching score of 20 for result entity name 2, and a third matching score of 18 for result entity name 3.

Referring back to FIG. 3, at step 320, method 300 determines whether matching scores 602 have been determined for all result entity names 214. If matching scores 602 have been determined for all result entity names 214, method 300 proceeds to step 322. If matching scores 602 have not been determined for all result entity names 214, method 300 proceeds back to step 318.

At step 322, methods 300 identifies one or more result entity names 214 with the highest matching scores 602. In some embodiments, methods 300 may rank the result entity names 214 based on their matching scores 602 and identify one or more result entity names 214 with the top-N (e.g., top-1) highest matching scores 602. For example, referring to FIG. 6, method 300 ranks result entity names 214 including result entity name 1, result entity name 2, and result entity name 3 based on their matching scores, and identifies result entity name 2 with the highest matching score of 20.

In some embodiments, method 300 includes additional steps or operations. For example, method 300 may include an additional step to identify one or more result web links 216 associated with one or more result entity names 214 with the highest matching scores as determined above in step 322. Method 300 may include another additional step to send the one or more result web links 216 as identified above to user 110 for validating whether the result web links 216 are relevant to entity name 202 in request 101 or not. For example, user 110 may click on a result web link 216 and be directed to a web page that includes information about a result entity name 214 associated with the result web link 216. User 110 may verify whether the information included in the web page is relevant to entity name 202 in request 101 or not. If user 110 determines that the information included in the web page is relevant to entity name 202, method 300 may cache the result entity name 214 and associated result web link 216. If user 110 determines that the information included in the web page is not relevant to entity name 202, method 300 may request user 110 to provide additional information associated with entity name 202 for further validation. For example, method 300 may request user 100 to provide an industry and/or sub-category associated with entity name 202.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skill in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for querying web pages to validate entity names, comprising:
a memory configured to store a search dictionary, the search dictionary configured to store a plurality of database names, wherein:
each database name corresponds with a search database;
each database name is linked with a uniform resource locator (URL) address for accessing the search database; and
each database name is associated with search formatting instructions for the search database;
a querying engine implemented by a processor communicatively coupled to the memory and configured to:
receive a request for validating an entity, the request comprising:
an entity name associated with the entity; and
a first field name that identifies a database name for a first search database;
identify a first URL address for the first search database in the search dictionary that is mapped to the first field name;
identify search formatting instructions for the first search database in the search dictionary that are mapped to the first field name;
convert the request to a first format based on the search formatting instructions for the first search database that are mapped to the first field name;
send the request having the first format to the first URL address; and
receive a result web page from the first search database in response to sending the request having the first format to the first URL address;
a parsing engine implemented by the processor configured to extract a set of result entity names from the results web page, wherein:
each result entity name corresponds with a related entity that is identified by the first search database; and
each result entity name is mapped to a result web link that identifies a URL address corresponding with a result entity name, and
an authentication engine implemented by the processor configured to:
compute a hash value for the entity name in the request by applying a predetermined hash function to the entity name in the request;
compute a set of hash values for the set of result entity names by applying the predetermined hash function to each of the set of result entity names;
compare the hash value for the entity name in the request to each of the hash values for the set of result entity names;
determine a matching score for each of the set of result entity names based on the comparison; and
rank the set of result entity names based on the determined matching score for each of the set of result entity names.

2. The system of claim 1, wherein the first search database is associated with one of the following: a state registry, a stock exchange, or a regulation authority.

3. The system of claim 1, wherein the request comprises a second field name identifying a second database name corresponding to a second URL address for a second search database in the search dictionary.

4. The system of claim 1, wherein the result web page comprises at least a web table that maps result entity names to corresponding result web links.

5. The system of claim 4, wherein the web table further comprises a current status for each result entity name.

6. The system of claim 1, wherein the predetermined hash function comprises a MD5 hash function.

7. A non-transitory computer-readable medium comprising a logic for querying web pages to validate entity names, the logic, when executed by one or more processors, instructing the one or more processors to:
store a search dictionary, the search dictionary configured to store a plurality of database names, wherein:
each database name corresponds with a search database;
each database name is linked with a uniform resource locator (URL) address for accessing the search database; and each database name is associated with search formatting instructions for the search database;
receive a request for validating an entity, the request comprising:
an entity name associated with the entity; and
a first field name that identifies a database name for a first search database;
identify a first URL address for the first database in the search dictionary that is mapped to the first field name;
identify search formatting instructions for the first database in the search dictionary that are mapped to the first field name;
convert the request to a first format based on the search formatting instructions for the first search database that are mapped to the first field name;
send the request having the first format to the first URL address;
receive a result web page from the first search database in response to sending the request having the first format to the first URL address;
extract a set of result entity names from the result web page, wherein:
each result entity name corresponds with a related entity that is identified by the first search database; and
each result entity name is mapped to a result web link that identifies a URL address corresponding with a result entity name;
compute a hash value for the entity name in the request by applying a predetermined hash function to the entity name in the request;
compute a set of hash values for the set of result entity names by applying the predetermined hash function to each of the set of result entity names;
compare the hash value for the entity name in the request to each of the hash values for the set of result entity names;
determine a matching score for each of the set of result entity names based on the comparison; and
rank the set of result entity names based on the determined matching score for each of the set of result entity names.

8. The non-transitory computer-readable medium of claim 7, wherein the first search database is associated with one of the following:
a state registry, a stock exchange, or a regulation authority.

9. The non-transitory computer-readable medium of claim 7, wherein the request comprises a second field name identifying a second database name corresponding to a second URL address for a second search database in the search dictionary.

10. The non-transitory computer-readable medium of claim 7, wherein the result web page comprises at least a web table that maps result entity names to corresponding result web links.

11. The non-transitory computer-readable medium of claim 10, wherein the web table further comprises a current status for each result entity name.

12. A method for querying web pages to validate entity names, comprising:
storing a search dictionary, the search dictionary configured to store a plurality of database names, wherein:
each database name corresponds with a search database;
each database name is linked with a uniform resource locator (URL) address for accessing the search database; and
each database name is associated with search formatting instructions for the search database;
receiving a request for validating an entity, the request comprising:
an entity name associated with the entity; and
a first field name that identifies a database name for a first search database;
identifying a first URL address for the first database in the search dictionary that is mapped to the first field name;
identifying search formatting instructions for the first search database in the search dictionary that are mapped to the first field name;
converting the request to a first format based on the search formatting instructions for the first search database that are mapped to the first field name;
sending the request having the first format to the first URL address;
receiving a result web page from the first search database in response to sending the request having the first format to the first URL address;
extracting a set of result entity names from the results web page, wherein:
each result entity name corresponds with a related entity that is identified by the first search database; and
each result entity name is mapped to a result web link that identifies a URL address corresponding with a result entity name;
computing a hash value for the entity name in the request by applying a predetermined hash function to the entity name in the request;
computing a set of hash values for the set of result entity names by applying the predetermined hash function to each of the set of result entity names;
comparing the hash value for the entity name in the request to each of the hash values for the set of result entity names;
determining a matching score for each of the set of result entity names based on the comparison; and
ranking the set of result entity names based on the determined matching score for each of the set of result entity names.

13. The method of claim 12, wherein the first search database is associated with one of the following: a state registry, a stock exchange, or a regulation authority.

14. The method of claim 12, wherein the request comprises a second field name identifying a second database name corresponding to a second URL address for a second search database in the search dictionary.

15. The method of claim 12, wherein the result web page comprises at least a web table that maps result entity names to corresponding result web links.

16. The method of claim 15, wherein the web table further comprises a current status for each result entity name.

17. The method of claim 12, wherein the predetermined hash function comprises a MD5 hash function.

* * * * *